US012502924B2

(12) United States Patent
Al Sakka et al.

(10) Patent No.: US 12,502,924 B2
(45) Date of Patent: Dec. 23, 2025

(54) VEHICLE SUSPENSION SYSTEM WITH MULTIPLE MODES OF OPERATION

(71) Applicant: DRiV Automotive Inc., Northville, MI (US)

(72) Inventors: Monzer Al Sakka, Sint-Truiden (BE); Miguel Dhaens, Lommel (BE)

(73) Assignee: Advanced Suspension Technology LLC, Northville, MI (US)

( * ) Notice: Subject to any disclaimer, the term of this patent is extended or adjusted under 35 U.S.C. 154(b) by 0 days.

(21) Appl. No.: 19/097,629

(22) Filed: Apr. 1, 2025

(65) Prior Publication Data

US 2025/0229592 A1    Jul. 17, 2025

Related U.S. Application Data

(62) Division of application No. 18/197,288, filed on May 15, 2023, now Pat. No. 12,291,073.

(51) Int. Cl.
*B60G 17/08*    (2006.01)
*B60G 13/08*    (2006.01)

(52) U.S. Cl.
CPC ............. *B60G 17/08* (2013.01); *B60G 13/08* (2013.01); *B60G 2202/24* (2013.01);
(Continued)

(58) Field of Classification Search
CPC .................................................. B60G 21/067
See application file for complete search history.

(56) References Cited

U.S. PATENT DOCUMENTS

| 5,562,305 A | 10/1996 | Heyring |
| 5,919,240 A | 7/1999 | Ney et al. |

(Continued)

FOREIGN PATENT DOCUMENTS

| CN | 103807344 A | 5/2014 |
| CN | 204037280 U | 12/2014 |

(Continued)

OTHER PUBLICATIONS

International Search Report and Written Opinion of the ISA issued in PCT/US2024/028588, mailed Jul. 25, 2024; ISA/US.

(Continued)

*Primary Examiner* — Nicole T Verley
(74) *Attorney, Agent, or Firm* — Harness, Dickey & Pierce, P.L.C.

(57) ABSTRACT

A suspension system including four dampers is disclosed where each damper includes a compression chamber and a rebound chamber. First and second hydraulic circuits interconnect the compression and rebound chambers of the front left and back right dampers, while third and fourth hydraulic circuits interconnect the compression and rebound chambers of the front right and back left dampers. A first bi-directional pump is connected between the first and second hydraulic circuits and a second bi-directional pump is connected between the third and fourth hydraulic circuits. The first and second bi-directional pumps can either pump in the same direction or in opposite directions. The level of pitch and roll stiffness can be adjusted by running the first and second bi-directional pumps to change the pressure in select hydraulic circuits of the system.

10 Claims, 10 Drawing Sheets

(52) U.S. Cl.
CPC ............... *B60G 2400/5182* (2013.01); *B60G 2500/114* (2013.01); *B60G 2800/012* (2013.01); *B60G 2800/014* (2013.01)

(56) References Cited

U.S. PATENT DOCUMENTS

| | | | |
|---|---|---|---|
| 6,010,139 A | 1/2000 | Heyring et al. | |
| 6,519,517 B1 | 2/2003 | Heyring et al. | |
| 7,240,906 B2 | 7/2007 | Klees | |
| 7,472,914 B2 | 1/2009 | Anderson et al. | |
| 7,686,309 B2 | 3/2010 | Munday et al. | |
| 8,123,235 B2 | 2/2012 | Monk et al. | |
| 8,695,768 B2 | 4/2014 | Kiriyama | |
| 9,080,631 B2 | 7/2015 | Hoult | |
| 10,315,736 B2* | 6/2019 | Monk | B63B 39/00 |
| 11,220,152 B2 | 1/2022 | Witte | |
| 12,083,848 B1* | 9/2024 | Dhaens | B60G 13/08 |
| 2004/0113377 A1 | 6/2004 | Klees | |
| 2006/0151969 A1* | 7/2006 | Revill | B60G 17/056 |
| | | | 280/124.162 |
| 2009/0140501 A1 | 6/2009 | Taylor et al. | |
| 2018/0345747 A1 | 12/2018 | Boon et al. | |
| 2019/0225044 A1 | 7/2019 | Witte | |
| 2021/0197640 A1 | 7/2021 | Yamashita | |
| 2022/0144035 A1 | 5/2022 | Al Sakka et al. | |
| 2022/0380004 A1* | 12/2022 | Walker | B60G 17/08 |
| 2023/0113777 A1 | 4/2023 | Vandersmissen et al. | |
| 2023/0113819 A1 | 4/2023 | Vandersmissen et al. | |
| 2023/0114717 A1 | 4/2023 | Boon et al. | |
| 2023/0115594 A1 | 4/2023 | Calchand et al. | |
| 2023/0278387 A1 | 9/2023 | Birch et al. | |

FOREIGN PATENT DOCUMENTS

| | | | |
|---|---|---|---|
| CN | 204037282 U | 12/2014 | |
| CN | 207059676 U | 3/2018 | |
| CN | 207902078 U | 9/2018 | |
| CN | 214057159 U | 8/2021 | |
| CN | 113382921 B * | 3/2024 | ........... B63B 39/005 |
| DE | 102020001633 A1 | 10/2020 | |
| WO | 2006092012 A1 | 9/2006 | |
| WO | 2007098559 A1 | 9/2007 | |
| WO | 2018226588 A1 | 12/2018 | |
| WO | 2020113287 A1 | 6/2020 | |
| WO | 2020214666 A1 | 10/2020 | |

OTHER PUBLICATIONS

International Search Report and Written Opinion of the ISA issued in PCT/US2024/028578, mailed Aug. 5, 2024; ISA/US.

International Search Report and Written Opinion of the ISA issued in PCT/US2024/028568, mailed Aug. 5, 2024; ISA/US.

* cited by examiner

VEHICLE SUSPENSION SYSTEM WITH MULTIPLE MODES OF OPERATION

CROSS-REFERENCE TO RELATED APPLICATIONS

The present disclosure is a divisional of U.S. patent application Ser. No. 18/197,288 filed on May 15, 2023. The entire disclosure of the application referenced above is incorporated herein by reference.

FIELD

The present disclosure relates generally to suspension systems for motor vehicles and more particularly to suspension systems that resist pitch and roll movements of a vehicle.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during corning (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning). Such mechanical systems cannot be easily switched off or cancelled out when roll stiffness is not needed. Some vehicles do have stabilizer bar/anti-roll bar disconnects that may be manually or electronically actuated, but the complexity and cost associated with these systems make them ill-suited for most vehicle applications.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll stiffness of the suspension system of the vehicle. However, the downside of such systems is that ride comfort is more difficult to achieve because bump forces can be transmitted from one damper to another damper across the hydraulic circuit resulting in unwanted suspension movement. Accordingly, there remains a need for improved vehicle suspension systems that can minimize roll, pitch, and other unwanted suspension movements while maintaining acceptable levels of ride comfort.

SUMMARY

This section provides a general summary of the disclosure, and is not a comprehensive disclosure of its full scope or all of its features.

In accordance with one aspect of the subject disclosure, a suspension system is provided that includes four dampers: a front left damper, a front right damper, a back left damper, and a back right damper. The front left damper includes a first compression chamber and a first rebound chamber. The front right damper includes a second compression chamber and a second rebound chamber. The back left damper includes a third compression chamber and a third rebound chamber. The back right damper includes a fourth compression chamber and a fourth rebound chamber.

The suspension system of the present disclosure also includes four hydraulic circuits: a first hydraulic circuit connects the first compression chamber of the front left damper in fluid communication with the fourth rebound chamber of the back right damper, a second hydraulic circuit connects the first rebound chamber of the front left damper in fluid communication with the fourth compression chamber of the back right damper, a third hydraulic circuit connects the second compression chamber of the front right damper in fluid communication with the third rebound chamber of the back left damper, and a fourth hydraulic circuit connects the second rebound chamber of the front right damper in fluid communication with the third compression chamber of the back left damper.

The suspension system of the present disclosure further comprises two bi-directional pumps: a first bi-directional pump that is fluidly connected to and arranged between the first and second hydraulic circuits and a second bi-directional pump that is fluidly connected to and arranged between the third and fourth hydraulic circuits. The first bi-directional pump has a first operating mode for pumping hydraulic fluid in a first direction from the first hydraulic circuit to the second hydraulic circuit and a second operating mode for pumping hydraulic fluid in a second direction from the second hydraulic circuit to the first hydraulic circuit. The second bi-directional pump has a third operating mode for pumping hydraulic fluid in a third direction from the third hydraulic circuit to the fourth hydraulic circuit and a fourth operating mode for pumping hydraulic fluid in a fourth direction from the fourth hydraulic circuit to the third hydraulic circuit.

In accordance with another aspect of the present disclosure, the suspension system further comprises one or more controllers that are electrically connected to the first and second bi-directional pumps. The one or more controllers are programmed to concurrently activate one of the first or second operating modes of the first bi-directional pump and one of the third or fourth operating modes of the second bi-directional pump at the same time. Thus, the first and second bi-directional pumps may pump in the same direction during some operating modes (e.g., pitch control and pressure control operating modes) and in opposite directions during other operating modes (i.e., roll control operating modes).

In accordance with another aspect of the present disclosure, the suspension system further comprises a reservoir. In accordance with this aspect, the first bi-directional pump is connected in fluid communication with the first hydraulic circuit via a first pump line and is connected in fluid communication with the second hydraulic circuit via a second pump line. Similarly, the second bi-directional pump is connected in fluid communication with the third hydraulic circuit via a third pump line and is connected in fluid communication with the fourth hydraulic circuit via a fourth pump line. The reservoir is connected to the first pump line via a first reservoir line and is connected to the second pump line via a second reservoir line.

Again, the first bi-directional pump has a first operating mode for pumping hydraulic fluid in the first direction from the first pump line to the second pump line to decrease fluid pressure in the first hydraulic circuit and a second operating mode for pumping hydraulic fluid in the second direction from the second pump line to the first pump line to increase fluid pressure in the first hydraulic circuit. The second bi-directional pump has a third operating mode for pumping hydraulic fluid in the third direction from the third pump line to the fourth pump line to decrease fluid pressure in the third hydraulic circuit and a fourth operating mode for pumping hydraulic fluid in the fourth direction from the fourth pump line to the third pump line to increase fluid pressure in the third hydraulic circuit.

Advantageously, the suspension system of the present disclosure is able to reduce/eliminate vehicle pitch and roll movements for improved grip, performance, handling, and braking. The reduction of pitch and roll angles improves the comfort, steering feel, agility, and stability of the vehicle. Pitch and roll control is provided by increasing the pitch stiffness or roll stiffness of the suspension system based on the fluid pressure in the system. The level of pitch and roll stiffness can be adjusted by using the bi-directional pumps to change the pressure in select hydraulic circuits of the system. Valves in the hydraulic circuits can also be opened to decouple the dampers in situations where added pitch and/or roll stiffness is not desired or necessary.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
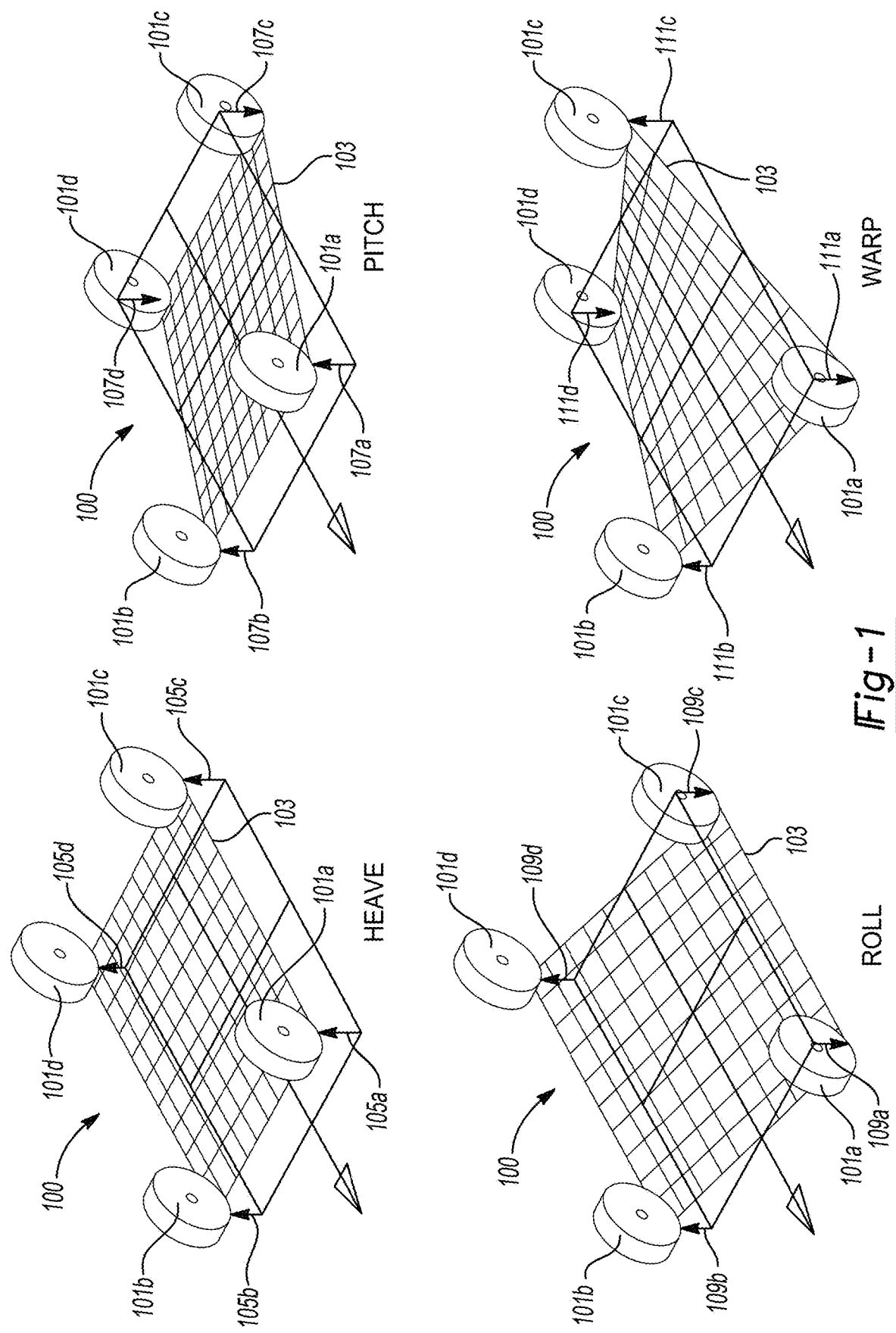
FIG. 1 is a schematic diagram illustrating an exemplary vehicle suspension system as it experiences suspension heave, pitch, roll, and warp.

Referring to the Figures, wherein like numerals indicate corresponding parts throughout the several views, various comfort valve equipped suspension systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, the term "controller(s)" may be replaced with the term "electrical circuit(s)." For example, the term "controller(s)" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller(s) may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

With reference to FIG. 1, a suspension system 100 for a vehicle is illustrated. The vehicle includes a front left wheel 101a, a front right wheel 101b, a back left wheel 101c, and a back right wheel 101d. While it should be appreciated that the vehicle may include a different number of wheels than those shown in FIG. 1, in most automotive applications, four wheels are used at each corner of the vehicle body 103. As shown in FIG. 1, there are four different types of suspension movements that vehicles routinely experience—heave, pitch, roll, and warp. When the suspension system 100 of the vehicle experiences heave, the vehicle body 103 either lifts (as illustrated in FIG. 1), such as when the vehicle travels over a crest (i.e., hill), or drops, such as when the vehicle travels over a dip (i.e., valley) in the road, which results in either a downward movement (not shown) or upward movement 105a-105d (as shown) of all four wheels 101a-101d simultaneously or nearly simultaneously. When the suspension system 100 of the vehicle experiences pitch, either the front of the vehicle body 103 lifts and the rear of the vehicle body 103 drops, such as during hard acceleration, or the front of the vehicle body 103 drops and the rear of the vehicle body 103 lifts, such as during hard braking. In the example shown in FIG. 1 illustrating pitch, the front of the vehicle body 103 is lifting and the rear of the vehicle body 103 is dropping (i.e., pitching aft), the front wheels 101a, 101b experience upward movement 107a, 107b while the rear wheels 101c, 101d experience downward movement 107c, 107d. The opposite occurs when the front of the vehicle body 103 is dropping and the rear of the vehicle body 103 is lifting (i.e., pitching forward). When the suspension system 100 of the vehicle experiences roll, either the right side of the vehicle body 103 lifts and the left side of the vehicle body 103 drops, such as during a hard right turn, or the right side of the vehicle body 103 drops and the left side of the vehicle body 103 lifts, such as during a hard left turn. In the example shown in FIG. 1 illustrating roll, when the right side of the vehicle body 103 is lifting and the left side of the vehicle body 103 is dropping (i.e., rolling left), the right wheels 101b, 101d experience upward movement 109b, 109d while the left wheels 101a, 101c experience downward movement 109a, 109c. The opposite occurs when the right side of the vehicle body 103 is dropping and the left side of the vehicle body 103 is lifting (i.e., rolling right). When the suspension system 100 of the vehicle experiences warp, either the front right and back left wheels 101b, 101c experience lifting (i.e., upward) movement 111b, 111c while the front left and back right wheels 101a, 101d experience dropping (i.e., downward) movement 111a, 111d (as illustrated in FIG. 1) or the front right and back left wheels 101b, 101c drop while the front left and back right wheels 101a, 101d lift. As will be explained in greater detail below, the object of the suspension system 100 described herein is to reduce or eliminate these movements.

Figure 2:
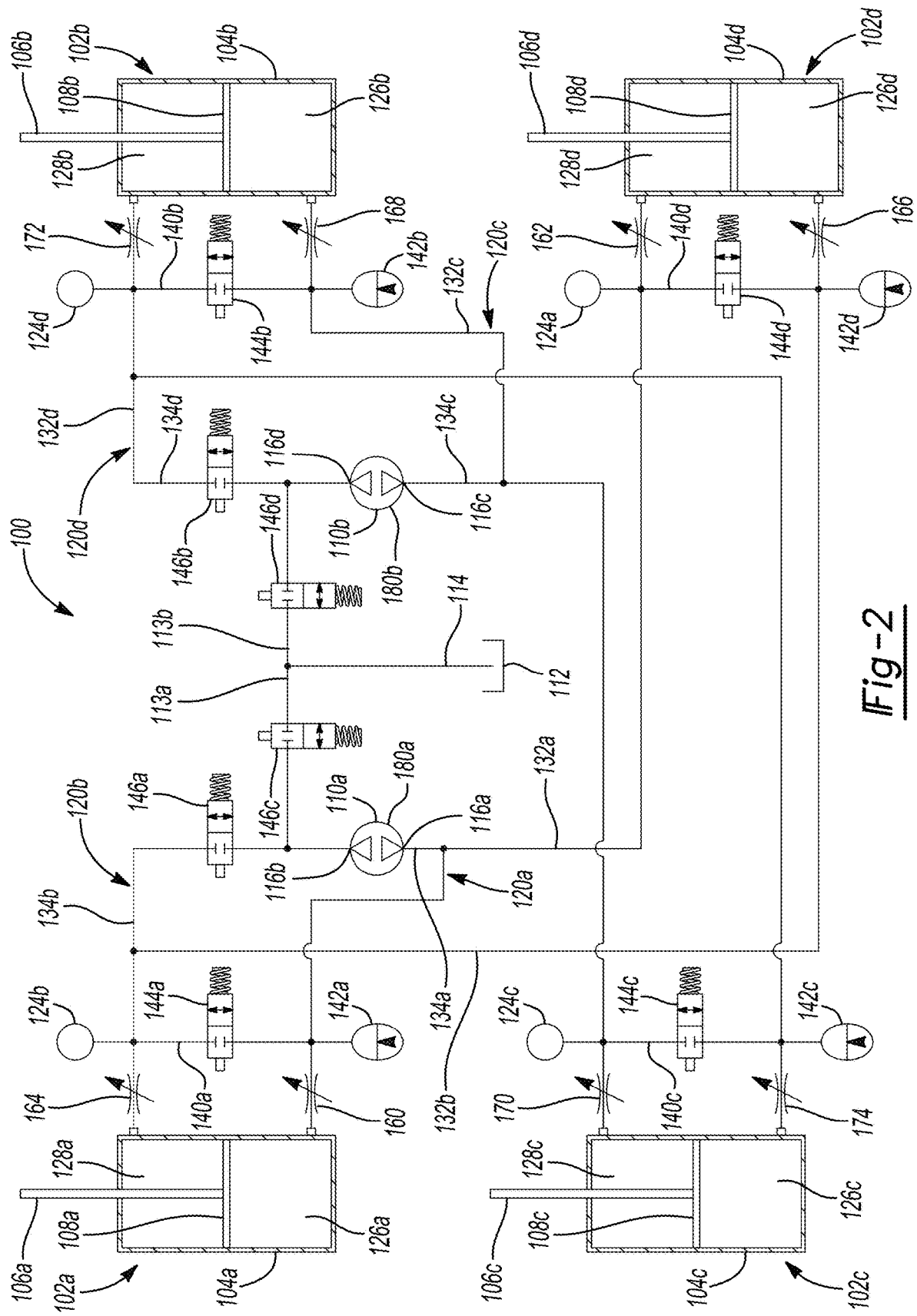
FIG. 2 is a schematic diagram illustrating an exemplary suspension system of the present disclosure that includes two bi-directional pumps.

With reference to FIG. 2, the suspension system 100 includes a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of a vehicle to control vertical movements of the front and rear wheels 101a-101d of the vehicle.

Each of the dampers 102a, 102b, 102c, 102d of the suspension system 100 includes a damper housing 104a, 104b, 104c, 104d, a piston rod 106a, 106b, 106c, 106d, and a piston 108a, 108b, 108c, 108d that is mounted on the piston rod 106a, 106b, 106c, 106d. The pistons 108a, 108b, 108c, 108d are closed pistons with no fluid flow paths defined within or by the piston structure. The pistons 108a, 108b, 108c, 108d are arranged in sliding engagement with and inside the damper housings 104a, 104b, 104c, 104d such that the pistons 108a, 108b, 108c, 108d divide each damper housing 104a, 104b, 104c, 104d into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 128c, and the back right damper 102d includes a fourth compression chamber 126d and a fourth rebound chamber 128d. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. The compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

The first compression chamber 126a of the front left damper 102a is connected in fluid communication with the fourth rebound chamber 128d of the back right damper 102d via a first hydraulic circuit 120a. The first hydraulic circuit 120a includes a first hydraulic line 132a that extends between and fluidly connects the first compression chamber 126a of the front left damper 102a and the fourth rebound chamber 128d of the back right damper 102d. The first hydraulic circuit 120a also includes a first pump line 134a that extends between and fluidly connects the first hydraulic line 132a with a first port 116a on a first bi-directional pump 110a. The first rebound chamber 128a of the front left damper 102a is connected in fluid communication with the fourth compression chamber 126d of the back right damper 102d via a second hydraulic circuit 120b. The second hydraulic circuit 120b includes a second hydraulic line 132b that extends between and fluidly connects the first rebound chamber 128a of the front left damper 102a and the fourth compression chamber 126d of the back right damper 102d. The second hydraulic circuit 120b also includes a second pump line 134b that extends between and fluidly connects the second hydraulic line 132b with a second port 116b on the first bi-directional pump 110a.

The second compression chamber 126b of the front right damper 102b is connected in fluid communication with the third rebound chamber 128c of the back left damper 102c via a third hydraulic circuit 120c. The third hydraulic circuit 120c includes a third hydraulic line 132c that extends between and fluidly connects the second compression chamber 126b of the front right damper 102b and the third rebound chamber 128c of the back left damper 102c. The third hydraulic circuit 120c also includes a third pump line 134c that extends between and fluidly connects the third hydraulic line 132c with a third port 116c on a second bi-directional pump 110b. The second rebound chamber 128b of the front right damper 102b is connected in fluid communication with the third compression chamber 126c of the back left damper 102c via a fourth hydraulic circuit 120d. The fourth hydraulic circuit 120d includes a fourth hydraulic line 132d that extends between and fluidly connects the second rebound chamber 128b of the front right damper 102b and the third compression chamber 126c of the back left damper 102c. The fourth hydraulic circuit 120d also includes a fourth pump line 134d that extends between and fluidly connects the fourth hydraulic line 132d with a fourth port 116d on the second bi-directional pump 110b.

The suspension system 100 also includes a front left bridge line 140a that extends between and fluidly connects the first hydraulic line 132a of the first hydraulic circuit 120a and the second hydraulic line 132b of the second hydraulic circuit 120b at a position located near the front left damper 102a, a front right bridge line 140b that extends between and fluidly connects the third hydraulic line 132c of the third hydraulic circuit 120c and the fourth hydraulic line 132d of the fourth hydraulic circuit 120d at a position located near the front right damper 102b, a back left bridge line 140c that extends between and fluidly connects the third hydraulic line 132c of the third hydraulic circuit 120c and the fourth hydraulic line 132d of the fourth hydraulic circuit 120d at a position located near the back left damper 102c, and a back right bridge line 140d that extends between and fluidly connects the first hydraulic line 132a of the first hydraulic circuit 120a and the second hydraulic line 132b of the second hydraulic circuit 120b at a position located near the back right damper 102d. The various hydraulic lines shown in the illustrated example are made of flexible tubing (e.g., hydraulic hoses), but it should be appreciated that other conduit structures and/or fluid passageways can be used.

The first hydraulic circuit 120a includes a first pair of variable flow control valves 160, 162 that are arranged at each end of the first hydraulic line 132a and are configured to regulate fluid flow between the first hydraulic circuit 120a and the first compression chamber 126a of the front left damper 102a and between the first hydraulic circuit 120a and the fourth rebound chamber 128d of the back right damper 102d, respectively. Similarly, the second hydraulic circuit 120b includes a second pair of variable flow control valves 164, 166 that are configured to regulate fluid flow between the second hydraulic circuit 120b and the first rebound chamber 128a of the front left damper 102a and between the first hydraulic circuit 120a and the fourth compression chamber 126d of the back right damper 102d, respectively. The third hydraulic circuit 120c includes a third pair of variable flow control valves 168, 170 that are arranged at each end of the third hydraulic line 132c and are configured to regulate fluid flow between the third hydraulic circuit 120c and the second compression chamber 126b of the front right damper 102b and between the third hydraulic circuit 120c and the third rebound chamber 128c of the back left damper 102c, respectively. Finally, the fourth hydraulic circuit 120d includes a fourth pair of variable flow control valves 172, 174 that are configured to regulate fluid flow between the fourth hydraulic circuit 120d and the second rebound chamber 128b of the front right damper 102b and between the fourth hydraulic circuit 120d and the third compression chamber 126c of the back left damper 102c, respectively. The variable flow control valves 160, 162, 164, 166, 168, 170, 172, 174 may be passive/spring-biased valves (e.g., spring-disc stacks) or active valves (e.g., electromechanical valves) and operate by controlling fluid flow into and out of the compression chambers 126a, 126b, 126c, 126d and rebound chambers 128a, 128b, 128c, 128d of the dampers 102a, 102b, 102c, 102d to change/adjust the rebound dampening rates and compression dampening rates. By way of example and without limitation, the variable flow control valves 160, 162, 164, 166, 168, 170, 172, 174 may be electromechanical valves with a combination of passive spring-disk elements and a solenoid. The solenoid of the variable flow control valves 160, 162, 164, 166, 168, 170, 172, 174 may be electrically connected to and actuated by one or more controllers 180a, 180b to change the damping characteristics of the dampers 102a, 102b, 102c, 102d (e.g., to soften or firm up the ride).

The first bi-directional pump 110a and second bi-directional pump 110b are connected to a hydraulic reservoir 112 (e.g., a tank) by first and second reservoir lines 113a, 113b that converge at a common reservoir line 114. The first reservoir line 113a extends between and fluidly connects the second pump line 134b and the common reservoir line 114, while the second reservoir line 113b extends between and fluidly connects the fourth pump line 134d and the common reservoir line 114. The first bi-directional pump 110a may operate (i.e., pump fluid) in two opposing directions 115a, 115b depending on the polarity of the electricity that is supplied to the first bi-directional pump 110a and the second bi-directional pump 110b may operate (i.e., pump fluid) in two opposing directions 115c, 115d depending on the polarity of the electricity that is supplied to the second bi-directional pump 110a.

The first port 116a of the first bi-directional pump 110a may operate as either an inlet port or an outlet port depending on the direction the first bi-directional pump 110a is operating in and the same is true for the second port 116b of the first bi-directional pump 110a. As a result, the first bi-directional pump 110a can operate to pump hydraulic fluid from the first hydraulic circuit 120a and to the second hydraulic circuit 120b, from the second hydraulic circuit 120b and to the first hydraulic circuit 120a, from the first hydraulic circuit 120a and to the first reservoir line 113a, or from the first reservoir line 113a and to the first hydraulic circuit 120a. In the example where the first bi-directional pump 110a is operating in a first direction 115a, the first port 116a is operating as an inlet port for the first bi-directional pump 110a and the second port 116b is operating as an outlet port for the first bi-directional pump 110a, the first bi-directional pump 110a draws in hydraulic fluid from the first pump line 134a via the first port 116a and discharges hydraulic fluid into the second pump line 134b via the second port 116b. In the example where the first bi-directional pump 110a is operating in a second direction 115b, the second port 116b is operating as an inlet port for the first bi-directional pump 110a and the first port 116a is operating as an outlet port for the first bi-directional pump 110a, the first bi-directional pump 110a draws in hydraulic fluid from the second pump line 134b via the second port 116b and discharges hydraulic fluid into the first pump line 134a via the first port 116a.

The third port 116c of the second bi-directional pump 110b may operate as either an inlet port or an outlet port depending on the direction the second bi-directional pump 110b is operating in and the same is true for the fourth port 116d of the second bi-directional pump 110b. As a result, the second bi-directional pump 110b can operate to pump hydraulic fluid from the third hydraulic circuit 120c and to the fourth hydraulic circuit 120d, from the fourth hydraulic circuit 120d and to the third hydraulic circuit 120c, from the third hydraulic circuit 120c and to the second reservoir line 113b, or from the second reservoir line 113b and to the third hydraulic circuit 120c. In the example where the second bi-directional pump 110b is operating in a third direction 115c, the third port 116c is operating as an inlet port for the second bi-directional pump 110b and the fourth port 116d is operating as an outlet port for the second bi-directional pump 110b, the second bi-directional pump 110b draws in hydraulic fluid from the third pump line 134c via the third port 116c and discharges hydraulic fluid into the fourth pump line 134d via the fourth port 116d. In the example where the second bi-directional pump 110b is operating in a fourth direction 115d, the fourth port 116d is operating as an inlet port for the second bi-directional pump 110b and the third port 116c is operating as an outlet port for the second bi-directional pump 110b, the second bi-directional pump 110b draws in hydraulic fluid from the fourth pump line 134d via the fourth port 116d and discharges hydraulic fluid into the third pump line 134c via the third port 116c.

A front left accumulator 142a is arranged in fluid communication with the first hydraulic line 132a at the junction where the first hydraulic line 132a joins the front left bridge line 140a. As such, the front left accumulator 142a is arranged in fluid communication with and regulates fluid pressure within the first hydraulic circuit 120a. A front right accumulator 142b is arranged in fluid communication with the third hydraulic line 132c at the junction between the third hydraulic line 132c and the front right bridge line 140b. As such, the front right accumulator 142b is arranged in fluid communication with and regulates fluid pressure within the third hydraulic circuit 120c. A back left accumulator 142c is arranged in fluid communication with the fourth hydraulic line 132d at the junction between the fourth hydraulic line 132*d* and the back left bridge line 140*c*. As such, the back left accumulator 142*c* is arranged in fluid communication with and regulates fluid pressure within the fourth hydraulic circuit 120*d*. A back right accumulator 142*d* is arranged in fluid communication with the second hydraulic line 132*b* at the junction between the second hydraulic line 132*b* and the back right bridge line 140*d*. As such, the back right accumulator 142*d* is arranged in fluid communication with and regulates fluid pressure within the second hydraulic circuit 120*b*. Each of the accumulators 142*a*, 142*b*, 142*c*, 142*d* have a variable fluid volume that increases and decreases depending on the fluid pressure in the hydraulic circuits 120*a*, 120*b*, 120*c*, 120*d*. It should be appreciated that the accumulators 142*a*, 142*b*, 142*c*, 142*d* may be constructed in a number of different ways. For example and without limitation, the accumulators 142*a*, 142*b*, 142*c*, 142*d* may have accumulation chambers and pressurized gas chambers that are separated by floating pistons, flexible membranes, or bellows.

The suspension system 100 also includes a first pressure sensor 124*a* that is arranged to monitor the pressure in the first hydraulic circuit 120*a*, a second pressure sensor 124*b* that is arranged to monitor the pressure in the second hydraulic circuit 120*b*, a third pressure sensor 124*c* that is arranged to monitor the pressure in the third hydraulic circuit 120*c*, and a fourth pressure sensor 124*d* that is arranged to monitor the pressure in the fourth hydraulic circuit 120*d*. Although other configurations are possible, the first pressure sensor 124*a* is connected to the junction between the first hydraulic line 132*a* and the back right bridge line 140*d* and is therefore arranged to measure fluid pressure in the first hydraulic line 132*a*. The second pressure sensor 124*b* is connected to the junction between the second hydraulic line 132*b* and the front left bridge line 140*a* and is therefore arranged to measure fluid pressure in the second hydraulic line 132*b*. The third pressure sensor 124*c* is connected to the junction between the third hydraulic line 132*c* and the back left bridge line 140*c* and is therefore arranged to measure fluid pressure in the third hydraulic line 132*c*. The fourth pressure sensor 124*d* is connected to the junction between the fourth hydraulic line 132*d* and the front right bridge line 140*b* and is therefore arranged to measure fluid pressure in the fourth hydraulic line 132*d*.

The suspension system 100 also includes eight electromechanical shut-off (i.e., on/off) valves 144*a*, 144*b*, 144*c*, 144*d*, 146*a*, 146*b*, 146*c*, 146*d*. A front left shut-off valve 144*a* is positioned in the front left bridge line 140*a*, a front right shut-off valve 144*b* is positioned in the front right bridge line 140*b*, a back left shut-off valve 144*c* is positioned in the back left bridge line 140*c*, and a back right shut-off valve 144*d* is positioned in the back right bridge line 140*d*. A first pump shut-off valve 146*a* is positioned in the second pump line 134*b*, a second pump shut-off valve 146*a* is positioned in the fourth pump line 134*d*, a third pump shut-off valve 146*c* is positioned in the first reservoir line 113*a*, and a fourth pump shut-off valve 146*d* is positioned in the second reservoir line 113*b*. In the illustrated example, the shut-off valves 144*a*, 144*b*, 144*c*, 144*d*, 146*a*, 146*b*, 146*c*, 146*d* are semi-active electro-mechanical valves with a combination of passive spring-disk elements and a solenoid that actuates the valve between open and closed positions.

The bi-directional pumps 110*a*, 110*b*, the pressure sensors 124*a*, 124*b*, 124*c*, 124*d*, and shut-off valves 144*a*, 144*b*, 144*c*, 144*d*, 146*a*, 146*b*, 146*c*, 146*d* are electrically connected to controllers 180*a*, 180*b*, which is configured to individually activate (i.e., turn on in forward or reverse) the bi-directional pumps 110*a*, 110*b* and individually open and close the shut-off valves 144*a*, 144*b*, 144*c*, 144*d*, 146*a*, 146*b*, 146*c*, 146*d* in response to various inputs, including signals from the pressure sensors 124*a*, 124*b*, 124*c*, 124*d*. The anti-pitch and anti-roll capabilities of the suspension system 100 will be explained in greater detail below; however, from FIG. 2 it should be appreciated that fluid pressure in the hydraulic circuits 120*a*, 120*b*, 120*c*, 120*d* can be adjusted by operation of the bi-directional pumps 110*a*, 110*b* to dynamically adjust the pitch and roll stiffness of the suspension system 100, which changes the degree to which the vehicle will lean fore or aft (i.e., pitch) or to one side or the other (i.e., roll). Thus, the suspension system 100 described herein can either augment or completely replace mechanical stabilizer bars/anti-roll bars. Such mechanical systems require relatively straight, unobstructed runs between each of the front dampers 102*a*, 102*b* and each of the back dampers 102*c*, 102*d*. Accordingly, the suspension system 100 disclosed herein offers packaging benefits because the dampers 102*a*, 102*b*, 102*c*, 102*d* only need to be hydraulically connected to one another and the bi-directional pumps 110*a*, 110*b*.

There are three primary types of suspension movements that the illustrated suspension system 100 can actively control by changing or adapting the roll and/or pitch stiffness of the vehicle: leaning to one side or the other during cornering (i.e., roll), pitching forward during braking (i.e., brake dive), and pitching aft during acceleration (i.e., rear end squat). Descriptions of how the suspension system 100 reacts to each of these conditions are provided below.

Figure 3:
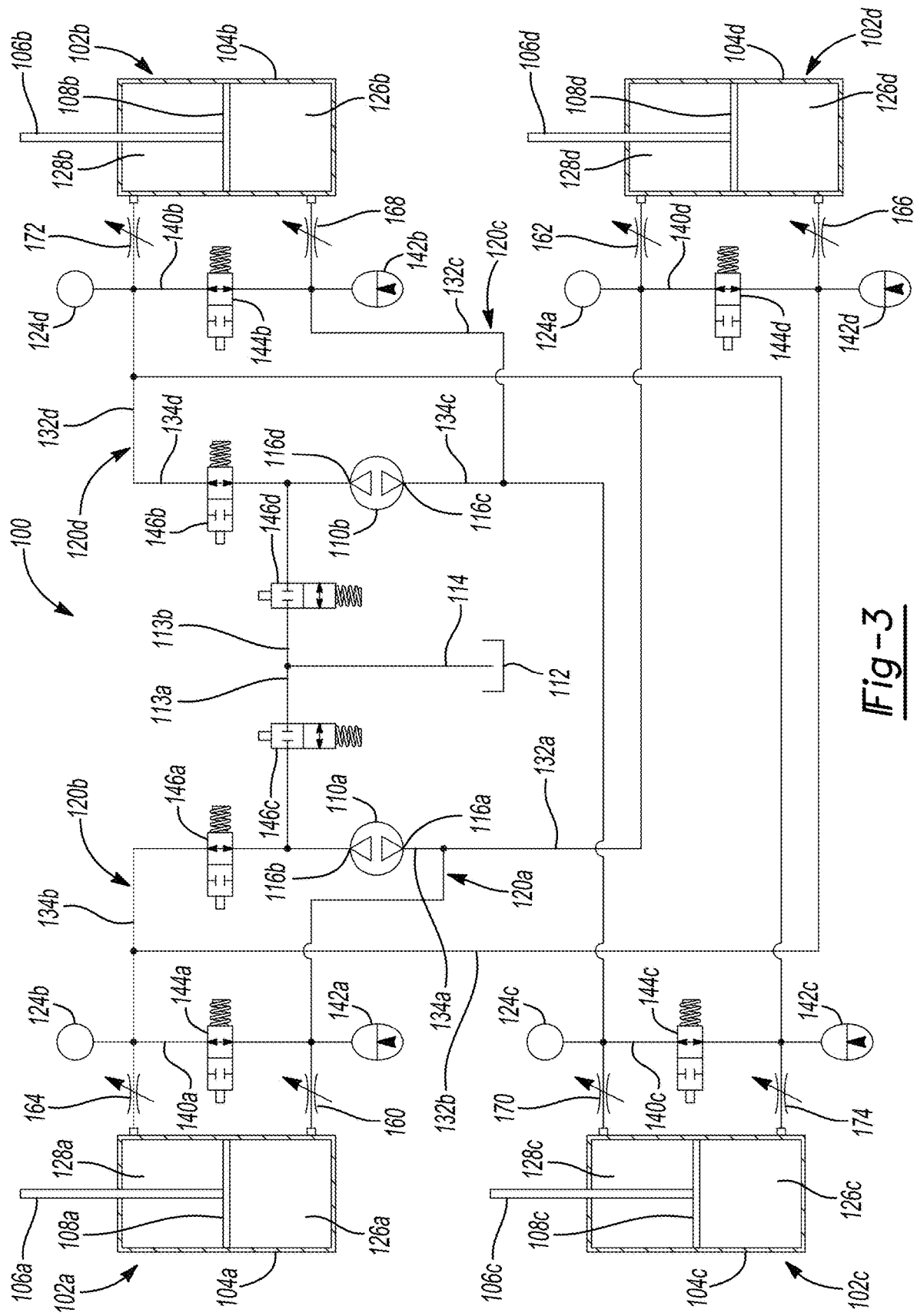
FIG. 3 is a schematic diagram illustrating the exemplary suspension system shown in FIG. 2 as it is operating in a comfort mode.

FIG. 3 illustrates the suspension system 100 in a comfort operating mode.

When active roll and/or pitch stiffness is not required, the controllers 180*a*, 180*b* may activate a comfort operating mode by opening the front left shut-off valve 144*a*, front right shut-off valve 144*b*, back left shut-off valve 144*c*, back right shut-off valve 144*d*, first pump shut-off valve 146*a*, and second pump shut-off valve 146*b*. Meanwhile, in the comfort operating mode, the third pump shut-off valve 146*c* and fourth pump shut-off valve 146*d* are closed and the first and second bi-directional pumps 110*a*, 110*b* are powered off to maintain substantially equal static pressures within all four hydraulic circuits 120*a*, 120*b*, 120*c*, 120*d*. In the comfort operation mode fluid flow is therefore permitted through valves 144*a*, 144*b*, 144*c*, 144*d*, 146*a*, 146*b* to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144*a* is open and the front left damper 102*a* undergoes a compression stroke as the front wheel hits a bump, fluid may flow from the first compression chamber 126*a* of the front left damper 102*a*, into the first hydraulic line 132*a*, from the first hydraulic line 132*a* to the second hydraulic line 132*b* by passing through the front left bridge line 140*a* and the front left comfort valve 144*a*, and into the first rebound chamber 128*a* of the front left damper 102*a*. Thus, fluid can travel from the first compression chamber 126*a* to the first rebound chamber 128*a* of the front left damper 102*a* with the only restriction coming from the variable control valves 160, 164, in any. As such, in the comfort operating mode, the dampers 102*a*, 102*b*, 102*c*, 102*d* are effectively decoupled from one another for improved ride comfort.

Figure 4:
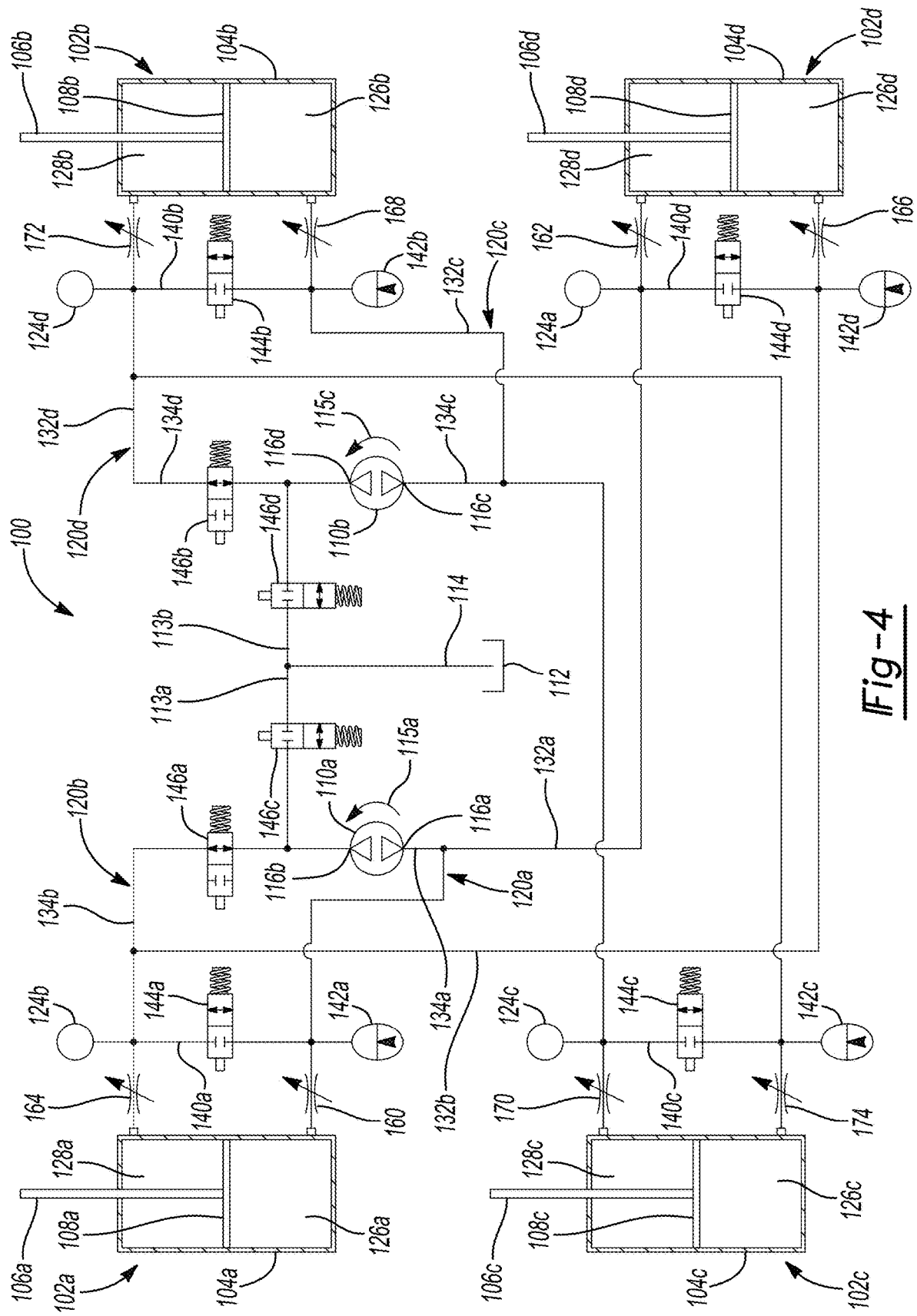
FIG. 4 is a schematic diagram illustrating the exemplary suspension system shown in FIG. 2 as it is operating in a pitch control mode during vehicle acceleration.

FIG. 4 illustrates the suspension system 100 in a pitch control operating mode when the vehicle is undergoing acceleration. During acceleration, the momentum of the sprung weight of the vehicle body 103 tends to make the vehicle body 103 pitch or squat rearward (i.e., aft), compressing the back left damper 102c and the back right damper 102d. When this occurs, fluid flows out from the third compression chamber 126c of the back left damper 102c into the fourth hydraulic line 132d and out from the fourth compression chamber 126d of the back right damper 102d into the first hydraulic line 132a. As a result of the weight transfer to the back/rear of the vehicle, the front left damper 102a and front right damper 102b begin to extend, causing fluid to flow out of the first rebound chamber 128a of the front left damper 102a into the second hydraulic line 132b and out of the second rebound chamber 128b of the front right damper 102b into the fourth hydraulic line 132d. As this occurs, the controllers 180a, 180b may activate a pitch control operating mode by closing the front left shut-off valve 144a, front right shut-off valve 144b, back left shut-off valve 144c, back right shut-off valve 144d, third pump shut-off valve 146c, and fourth pump shut-off valve 146d, opening the first and second pump shut-off valves 146a, 146b, and activating the first and second bi-directional pumps 110a, 110b to pump hydraulic fluid from the first and third hydraulic circuits 120a, 120c and into the second and fourth hydraulic circuits 120b, 120d. In this example, the first port 116a is operating as an inlet port for the first bi-directional pump 110a and the second port 116b is operating as an outlet port for the first bi-directional pump 110a. Similarly, the third port 116c is operating as an inlet port for the second bi-directional pump 110b and the fourth port 116d is operating as an outlet port for the second bi-directional pump 110b. Accordingly, the first bi-directional pump 110a draws in hydraulic fluid from the first pump line 134a via the first port 116a and discharges hydraulic fluid into the second pump line 134b via the second port 116b and the second bi-directional pump 110b draws in hydraulic fluid from the third pump line 134c via the third port 116c and discharges hydraulic fluid into the fourth pump line 134d via the fourth port 116d. Fluid flow is permitted through the first and second pump shut-off valves 146a, 146b such that the first and second bi-directional pumps 110a, 110b operate to increase fluid pressure in the second and fourth hydraulic lines 132b, 132d, which increases the pressure in the third compression chamber 126c of the back left damper 102c and the fourth compression chamber 126d of the back right damper 102d making the back left damper 102c and the back right damper 102d more difficult to compress. This counteracts the momentum of the sprung weight of the vehicle body 103 as it attempts to pitch or squat rearward (i.e., aft).

Figure 5:
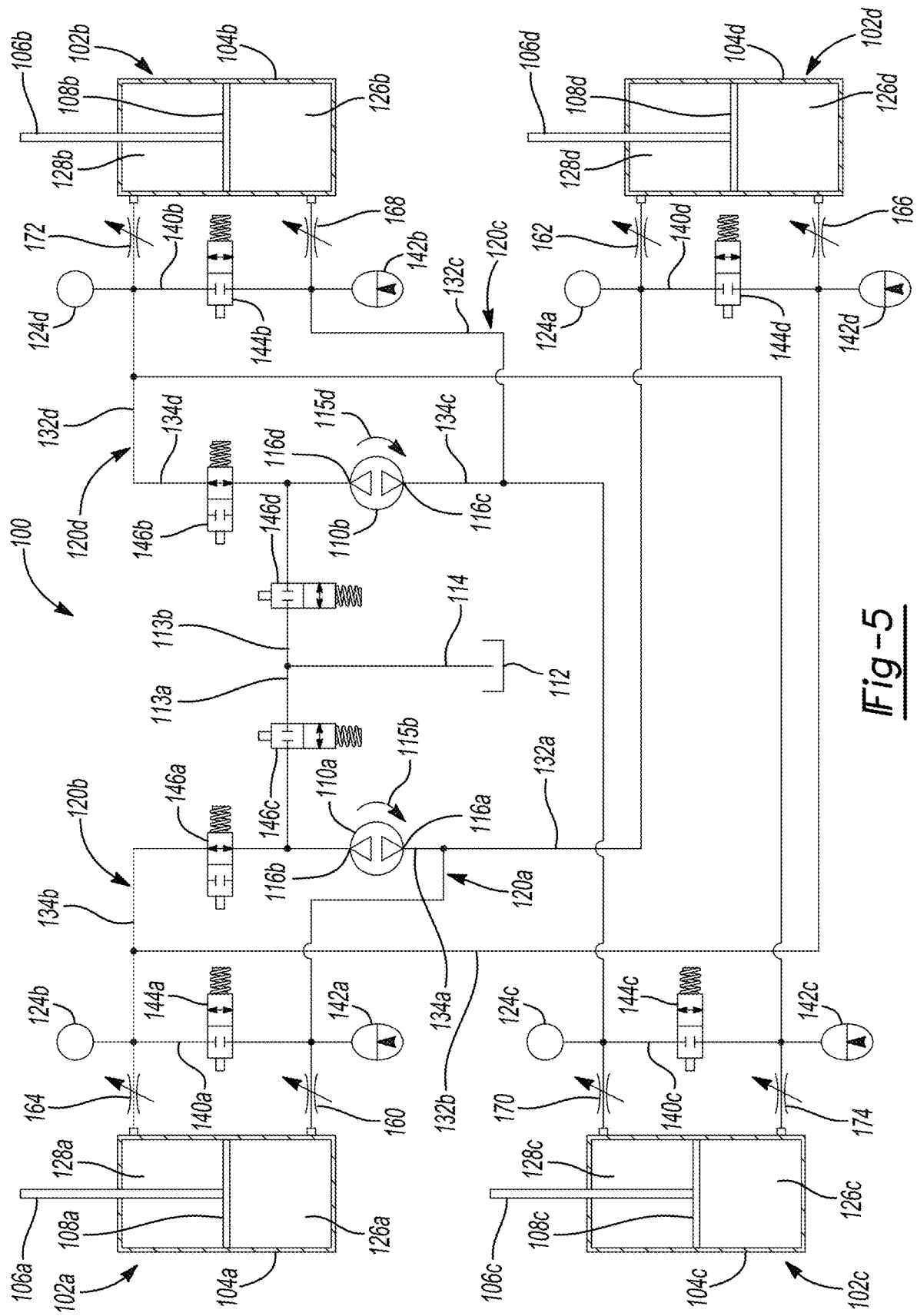
FIG. 5 is a schematic diagram illustrating the exemplary suspension system shown in FIG. 2 as it is operating in the pitch control mode during vehicle deceleration.

FIG. 5 illustrates the suspension system 100 in a pitch control operating mode when the vehicle is undergoing deceleration, such as during braking. During braking, the momentum of the sprung weight of the vehicle body 103 tends to make the vehicle body 103 pitch or dive forward, compressing the front left damper 102a and the front right damper 102b. When this occurs, fluid flows out from the first compression chamber 126a of the front left damper 102a into the first hydraulic line 132a and out from the second compression chamber 126b of the front right damper 102b into the third hydraulic line 132b. As a result of the weight transfer to the front of the vehicle, the back left damper 102c and back right damper 102d begin to extend, causing fluid to flow out of the third rebound chamber 128c of the back left damper 102c into the third hydraulic line 132c and out of the fourth rebound chamber 128d of the back right damper 102d into the first hydraulic line 132a. As this occurs, the controllers 180a, 180b may activate a pitch control operating mode by closing the front left shut-off valve 144a, front right shut-off valve 144b, back left shut-off valve 144c, back right shut-off valve 144d, third pump shut-off valve 146c, and fourth pump shut-off valve 146d, opening the first and second pump shut-off valves 146a, 146b, and activating the first and second bi-directional pumps 110a, 110b to pump hydraulic fluid from the second and fourth hydraulic circuits 120b, 120d and into the first and third hydraulic circuits 120a, 120c. In this example, the first port 116a is operating as an outlet port for the first bi-directional pump 110a and the second port 116b is operating as an inlet port for the first bi-directional pump 110a. Similarly, the third port 116c is operating as an outlet port for the second bi-directional pump 110b and the fourth port 116d is operating as an inlet port for the second bi-directional pump 110b. Accordingly, the first bi-directional pump 110a draws in hydraulic fluid from the second pump line 134b via the second port 116b and discharges hydraulic fluid into from the first pump line 134a via the first port 116a and the second bi-directional pump 110b draws in hydraulic fluid from the fourth pump line 134d via the fourth port 116d and discharges hydraulic fluid into the third pump line 134c via the third port 116c. Fluid flow is permitted through the first and second pump shut-off valves 146a, 146b such that the first and second bi-directional pumps 110a, 110b operate to increase fluid pressure in the first and third hydraulic lines 132a, 132c, which increases the pressure in the first compression chamber 126a of the front left damper 102a and the second compression chamber 126b of the front right damper 102b making the front left damper 102a and the front right damper 102d more difficult to compress. This counteracts the momentum of the sprung weight of the vehicle body 103 as it attempts to pitch or dive forward.

Figure 6:
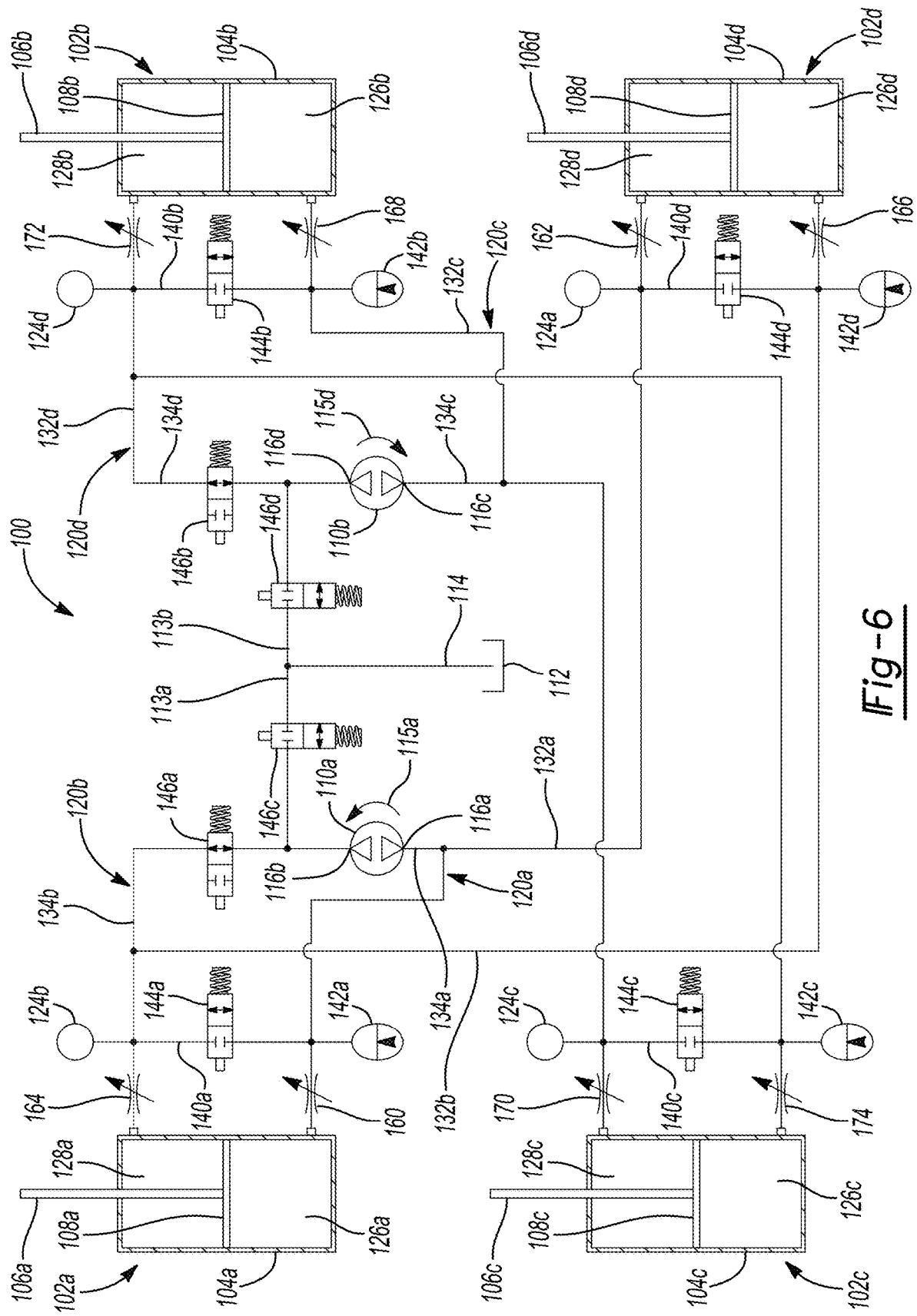
FIG. 6 is a schematic diagram illustrating the exemplary suspension system shown in FIG. 2 as it is operating in a roll control mode during a left turn.

FIG. 6 illustrates the suspension system 100 in a roll control operating mode when the vehicle is turning left. When the vehicle is placed in a left turn, the momentum of the sprung weight of the vehicle body 103 tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second and third hydraulic lines 132b, 132c. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the second and third hydraulic lines 132b, 132c. As this occurs, the controllers 180a, 180b may activate a roll control operating mode by closing the front left shut-off valve 144a, front right shut-off valve 144b, back left shut-off valve 144c, back right shut-off valve 144d, third pump shut-off valve 146c, and fourth pump shut-off valve 146d, opening the first and second pump shut-off valves 146a, 146b, activating the first bi-directional pump 110a to pump hydraulic fluid from the first hydraulic circuit 120a and into the second hydraulic circuit 120b, and activating the second bi-directional pump 110b in the opposite direction to pump hydraulic fluid from the fourth hydraulic circuit 120d and into the third hydraulic circuit 120c. In this example, the first port 116a is operating as an inlet port for the first bi-directional pump 110a and the second port 116b is operating as an outlet port for the first bi-directional pump 110a. By contrast, the third port 116c is operating as an outlet port for the second bi-directional pump 110*b* and the fourth port 116*d* is operating as an inlet port for the second bi-directional pump 110*b*. Accordingly, the first bi-directional pump 110*a* draws in hydraulic fluid from the first pump line 134*a* via the first port 116*a* and discharges hydraulic fluid into the second pump line 134*b* via the second port 116*b* and the second bi-directional pump 110*b* draws in hydraulic fluid from the fourth pump line 134*d* via the fourth port 116*d* and discharges hydraulic fluid into the third pump line 134*c* via the third port 116*c*. Fluid flow is permitted through the first and second pump shut-off valves 146*a*, 146*b* such that the first and second bi-directional pumps 110*a*, 110*b* operate to increase fluid pressure in the second and third hydraulic lines 132*b*, 132*c*, which increases the pressure in the second compression chamber 126*b* of the front right damper 102*b* and the fourth compression chamber 126*d* of the back right damper 102*d* making the front right damper 102*b* and the back right damper 102*d* more difficult to compress. This counteracts the momentum/roll moment of the sprung weight of the vehicle body 103 as it attempts to roll or lean to the right.

Figure 7:
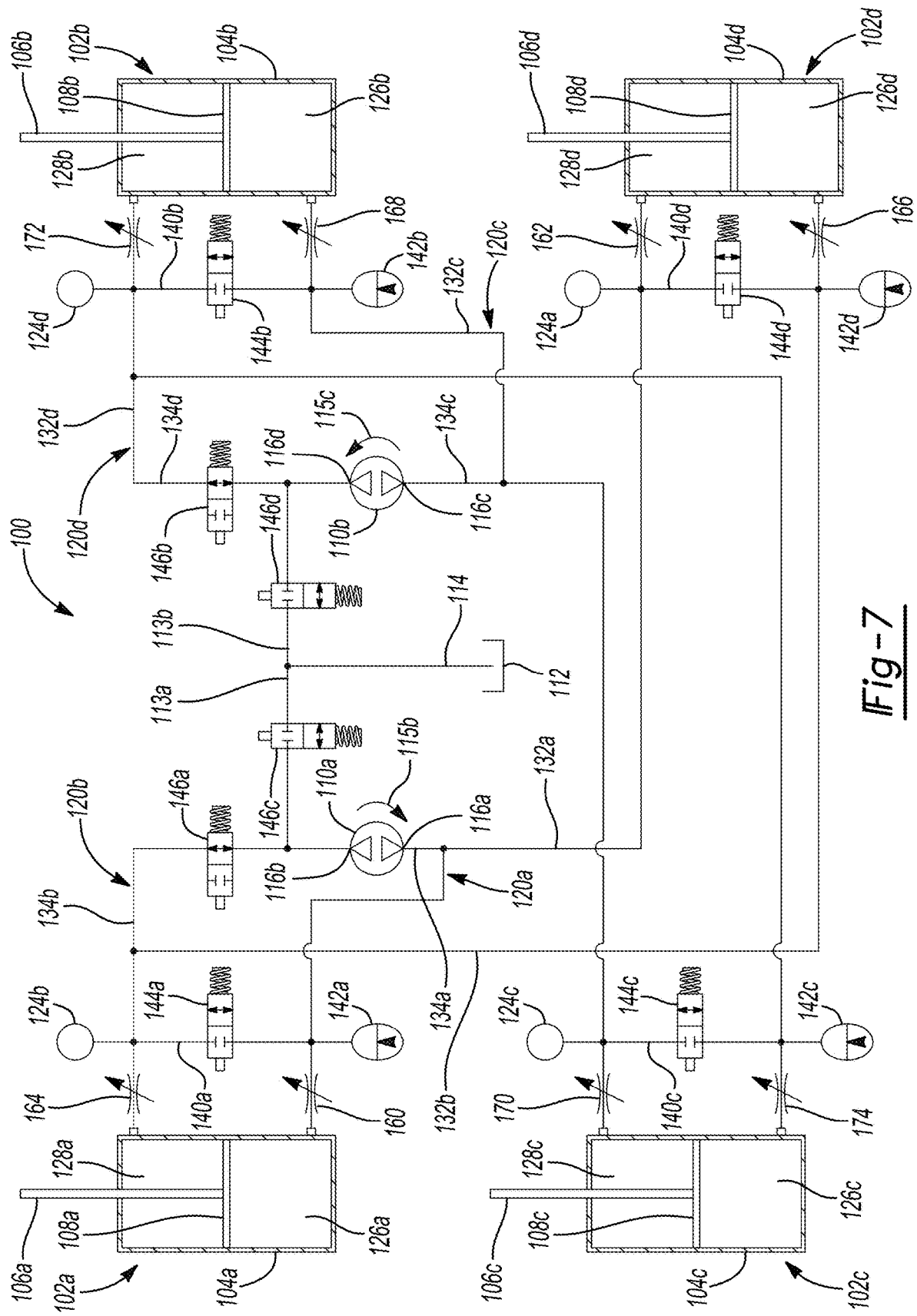
FIG. 7 is a schematic diagram illustrating the exemplary suspension system shown in FIG. 2 as it is operating in the roll control mode during a right turn.

FIG. 7 illustrates the suspension system 100 in a roll control operating mode when the vehicle is turning right. When the vehicle is placed in a right turn, the momentum of the sprung weight of the vehicle body 103 tends to make the vehicle lean left towards the outside of the turn, compressing the front left damper 102*a* and the back left damper 102*c*. When this occurs, fluid flows out from the first compression chamber 126*a* of the front left damper 102*a* and the third compression chamber 126*c* of the back left damper 102*c* into the first and fourth hydraulic lines 132*a*, 132*d*. As a result of the weight transfer to the left side of the vehicle, the front right damper 102*b* and back right damper 102*d* begin to extend, causing fluid to flow out of the second rebound chamber 128*b* of the front right damper 102*b* and the fourth rebound chamber 128*d* of the back right damper 102*d* into the first and fourth hydraulic lines 132*a*, 132*d*. As this occurs, the controllers 180*a*, 180*b* may activate a roll control operating mode by closing the front left shut-off valve 144*a*, front right shut-off valve 144*b*, back left shut-off valve 144*c*, back right shut-off valve 144*d*, third pump shut-off valve 146*c*, and fourth pump shut-off valve 146*d*, opening the first and second pump shut-off valves 146*a*, 146*b*, activating the first bi-directional pump 110*a* to pump hydraulic fluid from the second hydraulic circuit 120*b* and into the first hydraulic circuit 120*a*, and activating the second bi-directional pump 110*b* in the opposite direction to pump hydraulic fluid from the third hydraulic circuit 120*c* and into the fourth hydraulic circuit 120*d*. In this example, the first port 116*a* is operating as an outlet port for the first bi-directional pump 110*a* and the second port 116*b* is operating as an inlet port for the first bi-directional pump 110*a*. By contrast, the third port 116*c* is operating as an inlet port for the second bi-directional pump 110*b* and the fourth port 116*d* is operating as an outlet port for the second bi-directional pump 110*b*. Accordingly, the first bi-directional pump 110*a* draws in hydraulic fluid from the second pump line 134*b* via the second port 116*b* and discharges hydraulic fluid into the first pump line 134*a* via the first port 116*a* and the second bi-directional pump 110*b* draws in hydraulic fluid from the third pump line 134*c* via the third port 116*c* and discharges hydraulic fluid into the fourth pump line 134*d* via the fourth port 116*d*. Fluid flow is permitted through the first and second pump shut-off valves 146*a*, 146*b* such that the first and second bi-directional pumps 110*a*, 110*b* operate to increase fluid pressure in the first and fourth hydraulic lines 132*a*, 132*d*, which increases the pressure in the first compression chamber 126*a* of the front left damper 102*a* and the third compression chamber 126*c* of the back left damper 102*c* making the front left damper 102*a* and the back left damper 102*c* more difficult to compress. This counteracts the momentum/roll moment of the sprung weight of the vehicle body 103 as it attempts to roll or lean to the left.

Figure 8:
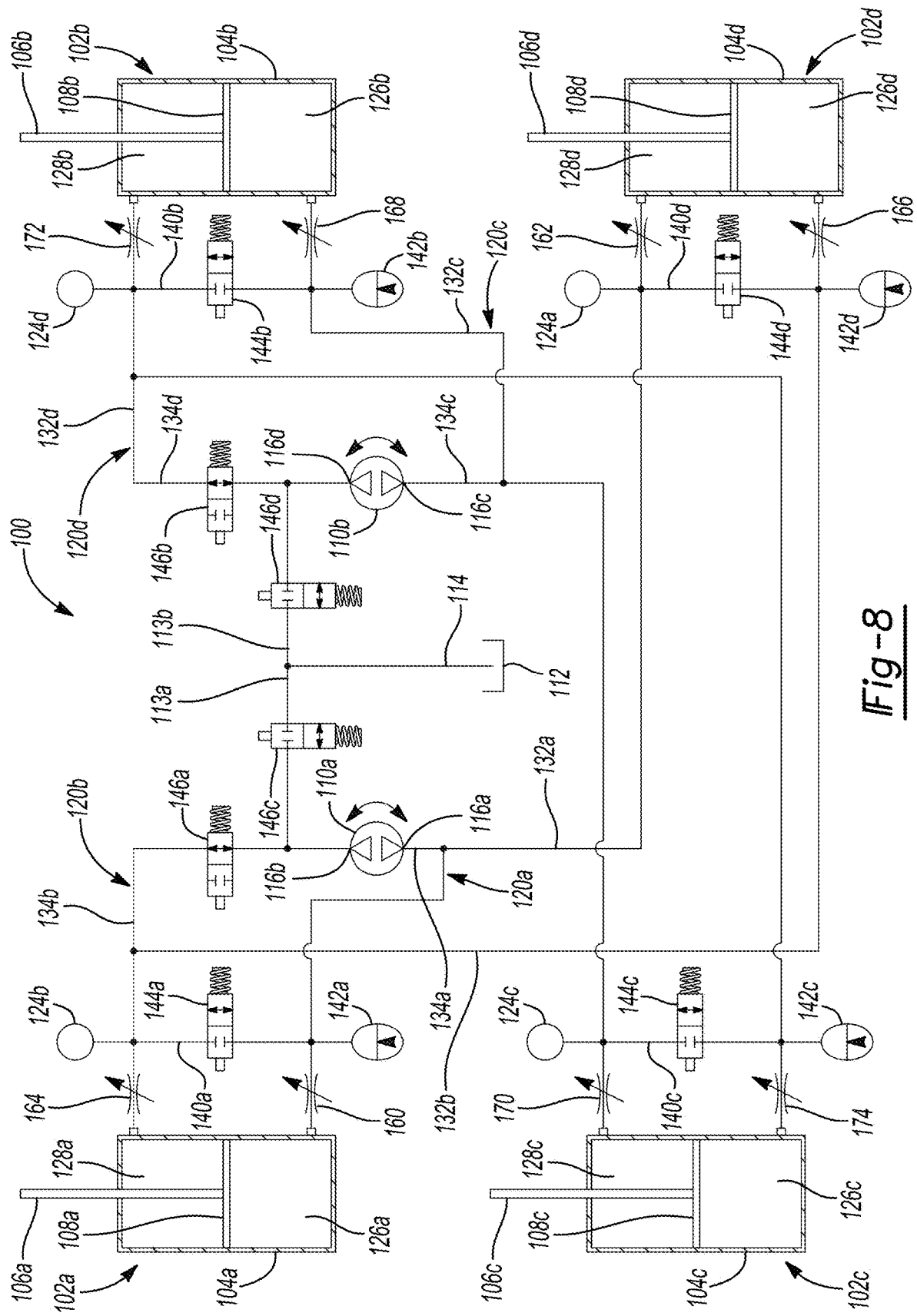
FIG. 8 is a schematic diagram illustrating the exemplary suspension system shown in FIG. 2 as it is operating in a combined pitch and roll control mode.

FIG. 8 illustrates the suspension system 100 in a combined pitch and roll control operating mode when the vehicle is turning left or right and braking or when the vehicle is turning left or right and accelerating. When the vehicle is placed in a left turn and undergoing deceleration, the momentum of the sprung weight of the vehicle body 103 tends to make the vehicle lean right towards the outside of the turn and to make the vehicle body 103 pitch forward, transferring more of the weight of the vehicle body 103 to the front right wheel 101*b* of the vehicle, compressing the front right damper 102*b* and compressing the back right damper 102*d* and the front left damper 102*a* to a lesser degree. When this occurs, fluid flows out from the first compression chamber 126*a* of the front left damper 102*a* and the second compression chamber 126*b* of the front right damper 102*b* and the fourth compression chamber 126*d* of the back right damper 102*d* and into the first, second, and third hydraulic lines 132*a*, 132*b*, 132*c*. As a result of the weight transfer to the front right wheel 101*b* of the vehicle, the back left damper 102*c* extends, causing fluid to flow out of the third rebound chamber 128*c* of the back left damper 102*c* and into the third hydraulic line 132*c*. As this occurs, the controllers 180*a*, 180*b* may activate a combined roll/pitch control operating mode by closing the front left shut-off valve 144*a*, front right shut-off valve 144*b*, back left shut-off valve 144*c*, back right shut-off valve 144*d*, third pump shut-off valve 146*c*, and fourth pump shut-off valve 146*d*, opening the first and second pump shut-off valves 146*a*, 146*b*, activating the first bi-directional pump 110*a* to pump hydraulic fluid from the second hydraulic circuit 120*b* and into the first hydraulic circuit 120*a*, and activating the second bi-directional pump 110*b* to pump hydraulic fluid from the fourth hydraulic circuit 120*d* and into the third hydraulic circuit 120*c*. This is similar to the pitch control operating mode; however, in the combined roll/pitch control operating mode the second bi-directional pump 110*b* may be run longer or faster than the first bi-directional pump 110*a* so that the pressure differential between the third and fourth hydraulic circuits 120*c*, 120*d* is greater than the pressure differential between the first and second hydraulic circuits 120*a*, 120*b* to counteract body roll/lean to the right.

When the vehicle is placed in a right turn and undergoing deceleration, the momentum of the sprung weight of the vehicle body 103 tends to make the vehicle lean left towards the outside of the turn and to make the vehicle body 103 pitch forward, transferring more of the weight of the vehicle body 103 to the front left wheel 101*a* of the vehicle, compressing the front left damper 102*a* and compressing the back left damper 102*c* and the front right damper 102*b* to a lesser degree. As this occurs, the controllers 180*a*, 180*b* may activate the same combined roll/pitch control operating mode described above, but may run the first bi-directional pump 110*a* longer or faster than the second bi-directional pump 110*b* so that the pressure differential between the first and second hydraulic circuits 120*a*, 120*b* is greater than the pressure differential between the third and fourth hydraulic circuits 120*c*, 120*d* to counteract body roll/lean to the left.

When the vehicle is placed in a left turn and undergoing acceleration, the momentum of the sprung weight of the vehicle body 103 tends to make the vehicle lean right towards the outside of the turn and to make the vehicle body 103 pitch rearward, transferring more of the weight of the vehicle body 103 to the back right wheel 101d of the vehicle, compressing the back right damper 102d and compressing the front right damper 102b and the back left damper 102c to a lesser degree. As this occurs, the controllers 180a, 180b may activate a combined roll/pitch control operating mode by closing the front left shut-off valve 144a, front right shut-off valve 144b, back left shut-off valve 144c, back right shut-off valve 144d, third pump shut-off valve 146c, and fourth pump shut-off valve 146d, opening the first and second pump shut-off valves 146a, 146b, activating the first bi-directional pump 110a to pump hydraulic fluid from the first hydraulic circuit 120a and into the second hydraulic circuit 120b, and activating the second bi-directional pump 110b to pump hydraulic fluid from the third hydraulic circuit 120c and into the fourth hydraulic circuit 120d. This is similar to the pitch control operating mode; however, in the combined roll/pitch control operating mode the first bi-directional pump 110a may be run longer or faster than the second bi-directional pump 110b so that the pressure differential between the first and second hydraulic circuits 120a, 120b is greater than the pressure differential between the third and fourth hydraulic circuits 120c, 120d to counteract body roll/lean to the right.

When the vehicle is placed in a right turn and undergoing acceleration, the momentum of the sprung weight of the vehicle body 103 tends to make the vehicle lean left towards the outside of the turn and to make the vehicle body 103 pitch rearward, transferring more of the weight of the vehicle body 103 to the back left wheel 101c of the vehicle, compressing the back left damper 102c and compressing the back right damper 102d and the front left damper 102a to a lesser degree. As this occurs, the controllers 180a, 180b may activate the same combined roll/pitch control operating mode described above, but may run the second bi-directional pump 110b longer or faster than the first bi-directional pump 110a so that the pressure differential between the third and fourth hydraulic circuits 120c, 120d is greater than the pressure differential between the first and second hydraulic circuits 120a, 120b to counteract body roll/lean to the left.

Thus, the directions 115a-115d in which the first and second bi-directional pumps 110a, 110b rotate depend on the forces applied to each damper 102a-102d of the vehicle, which translate to hydraulic torques placed on the first and second bi-directional pumps 110a, 110b. A hydraulic torque is the pressure difference between the ports 116a and 116b of the first bi-directional pump 110a and the ports 116c and 116d of the second bi-directional pump 110b, which can be positive or negative. When controller 180a request a positive torque (for example 10 bar) and the pressure differential between ports 116a and 116b is 7 bar (for example), the first bi-directional pump 110a needs to rotate in the first direction 115a to increase the pressure differential from 7 to 10 bar, but if the pressure differential was already higher than 10 bar (for example 13 bar), then the first bi-directional pump 110a needs to run in the opposite direction (i.e., the second direction 115b) to reduce the pressure differential to 10 bar, and the controller 180a will keep regulating the requested hydraulic torque by rotating the first bi-directional pump 110a in both directions 115a, 115b. Controller 180b controls the second bi-directional pump 110b in a similar fashion.

Figure 9:
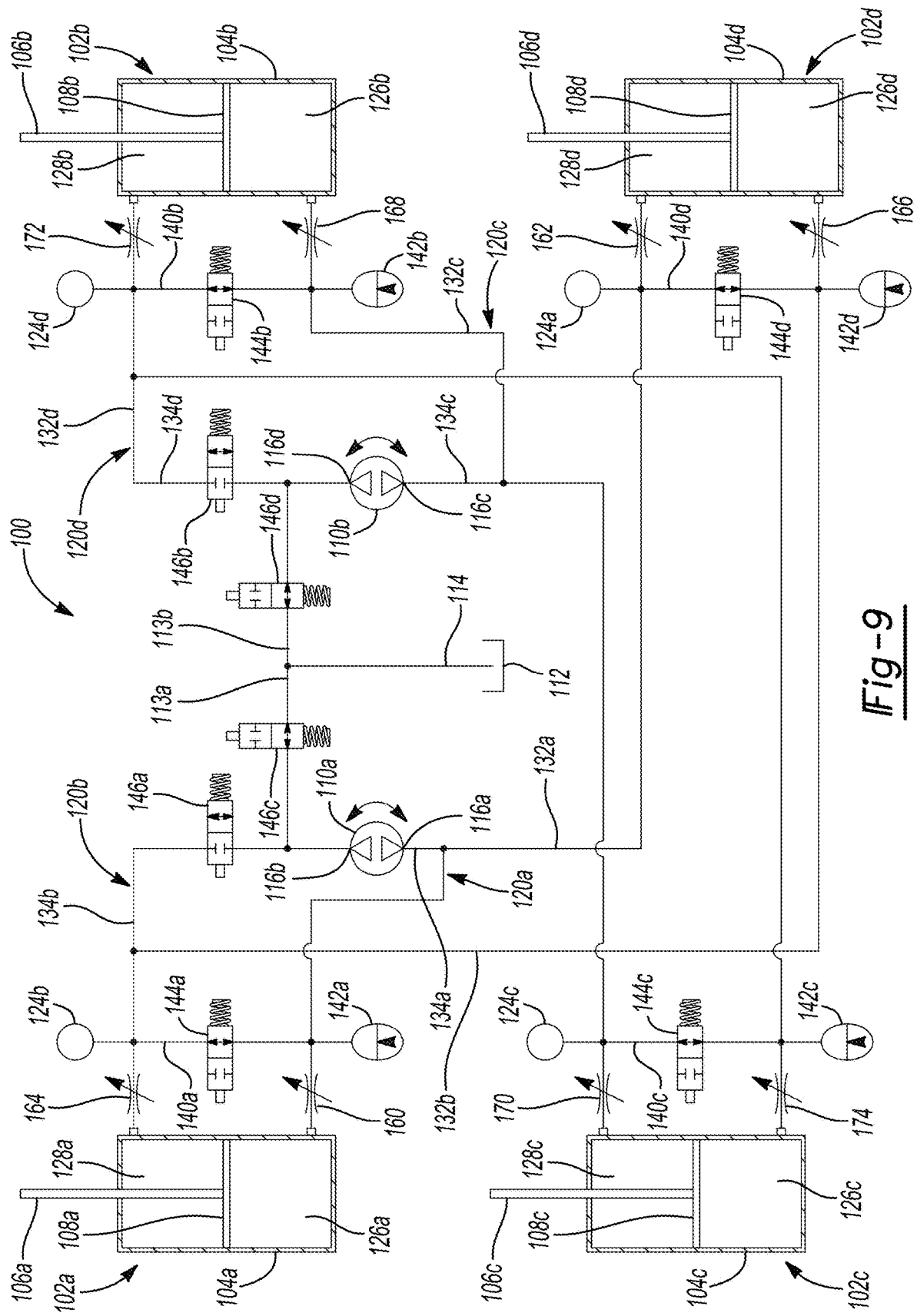
FIG. 9 is a schematic diagram illustrating the exemplary suspension system shown in FIG. 2 as it is operating in a pressure control mode.

FIG. 9 illustrates the suspension system 100 in a pressure control operating mode. The object of the pressure control operating mode is to increase or decrease the static pressure in all hydraulic circuits 120a, 120b, 120c, 120d of the suspension system 100 by either pumping hydraulic fluid out of the reservoir 112 and into the hydraulic circuits 120a, 120b, 120c, 120d (to increase the static pressure in the suspension system 100) or by pumping hydraulic fluid out of the hydraulic circuits 120a, 120b, 120c, 120d and into the reservoir 112 (to decrease the static pressure in the suspension system 100). In the pressure control operating mode, the controllers 180a, 180b open the front left shut-off valve 144a, front right shut-off valve 144b, back left shut-off valve 144c, back right shut-off valve 144d, third pump shut-off valve 146c, and fourth pump shut-off valve 146d and at the same time closes the first pump shut-off valve 146a and second pump shut-off valve 146a.

To reduce fluid pressure in the hydraulic circuits 120a, 120b, 120c, 120d of the suspension system 100, the controllers 180a, 180b activate the first and second bi-directional pumps 110a, 110b to pump hydraulic fluid from the first and third hydraulic circuits 120a, 120c and into the reservoir 112 via the first and second reservoir lines 113a, 113b. In this example, the first port 116a is operating as an inlet port for the first bi-directional pump 110a and the second port 116b is operating as an outlet port for the first bi-directional pump 110a. Similarly, the third port 116c is operating as an inlet port for the second bi-directional pump 110b and the fourth port 116d is operating as an outlet port for the second bi-directional pump 110b. Accordingly, the first bi-directional pump 110a draws in hydraulic fluid from the first pump line 134a via the first port 116a and discharges hydraulic fluid into the second pump line 134b via the second port 116b and the second bi-directional pump 110b draws in hydraulic fluid from the third pump line 134c via the third port 116c and discharges hydraulic fluid into the fourth pump line 134d via the fourth port 116d. Fluid flow is blocked by the first and second pump shut-off valves 146a, 146b, which are closed, but the third and fourth pump shut-off valves 146c, 146d are open, so the hydraulic fluid discharged from the second port 116b of the first bi-directional pump 110a flows into the first reservoir line 113a and the hydraulic fluid discharged from the fourth port 116d of the second bi-directional pump 110b flows into the second reservoir line 113a. Because the front left shut-off valve 144a, front right shut-off valve 144b, back left shut-off valve 144c, back right shut-off valve 144d are all open, this reduces the static pressure in all of the hydraulic circuits 120a, 120b, 120c, 120d.

To raise fluid pressure in the hydraulic circuits 120a, 120b, 120c, 120d of the suspension system 100, the controllers 180a, 180b activate the first and second bi-directional pumps 110a, 110b to pump hydraulic fluid from the reservoir 112 and into the first and third hydraulic circuits 120a, 120c. In this example, the first port 116a is operating as an outlet port for the first bi-directional pump 110a and the second port 116b is operating as an inlet port for the first bi-directional pump 110a. Similarly, the third port 116c is operating as an outlet port for the second bi-directional pump 110b and the fourth port 116d is operating as an inlet port for the second bi-directional pump 110b. Accordingly, the first bi-directional pump 110a draws in hydraulic fluid from the second pump line 134b via the second port 116b and discharges hydraulic fluid into from the first pump line 134a via the first port 116a and the second bi-directional pump 110b draws in hydraulic fluid from the fourth pump line 134d via the fourth port 116d and discharges hydraulic fluid into the third pump line 134c via the third port 116c. Fluid flow is blocked by the first and second pump shut-off valves 146a, 146b, which are closed, but the third and fourth pump shut-off valves 146c, 146d are open, so the second port 116b of the first bi-directional pump 110a draws in hydraulic fluid from the first reservoir line 113a and the fourth port 116d of the second bi-directional pump 110b draws in hydraulic fluid from the second reservoir line 113a. Because the front left shut-off valve 144a, front right shut-off valve 144b, back left shut-off valve 144c, back right shut-off valve 144d are all open, this increases the static pressure in all of the hydraulic circuits 120a, 120b, 120c, 120d.

Figure 10:
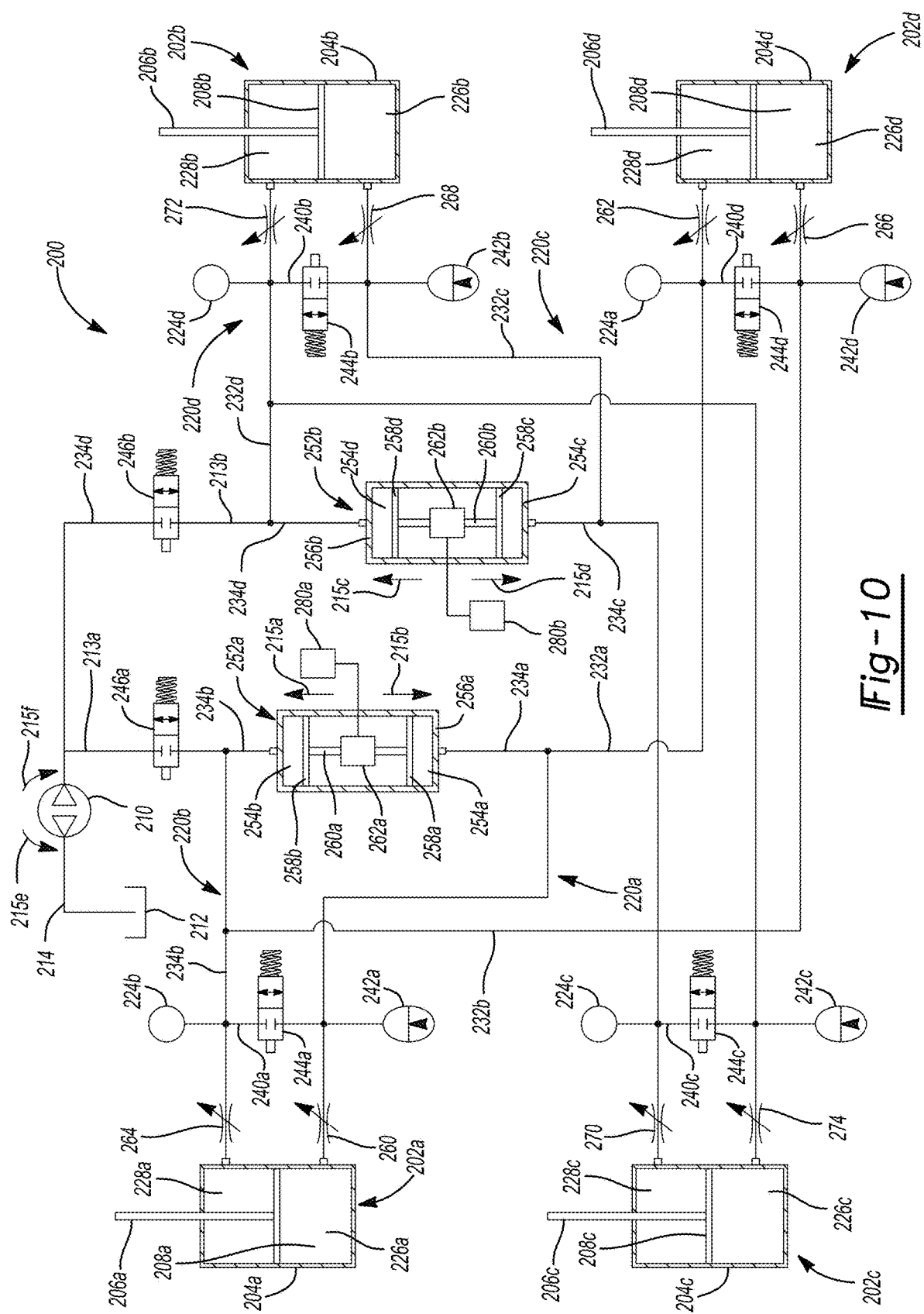
FIG. 10 is a schematic diagram illustrating another exemplary suspension system of the present disclosure that includes two dual chamber ball-screw mechanisms.

FIG. 10 illustrates another suspension system 200 that shares many of the same components as the suspension system 100 illustrated in FIGS. 2-9, but the first and second bi-directional pumps 110a, 110b shown in FIGS. 2-9 have been replaced with first and second dual chamber ball-screw mechanisms 252a, 252b in FIG. 10. Rather than repeat the description set forth above, the following paragraphs describe the structure and function of the components in FIG. 10 that are new and/or different from those shown and described in connection with FIGS. 2-9. It should be appreciated that the reference numbers in FIG. 10 are "200" series numbers (e.g., 200, 202a, 204a, etc.), but otherwise share the same base reference numbers as the corresponding elements in FIGS. 2-9. Thus, the same description for elements 100, 102a, 104a above applies to elements 200, 202a, 204a in FIG. 10 and so on and so forth, except as otherwise noted.

As its name implies, the first dual chamber ball-screw mechanism 252a includes a first variable volume chamber 254a and a second variable volume chamber 254b at opposing ends of a first cylinder housing 256a. The first variable volume chamber 254a is arranged in fluid communication with the first pump line 234a and therefore the first hydraulic circuit 220a, while the second variable volume chamber 254b is arranged in fluid communication with the second pump line 234b and therefore the second hydraulic circuit 220b. The first and second variable volume chambers 254a, 254b are separated by a first pair of driven pistons 258a, 258b, which are connected to a move together in unison with a first threaded rod 260a. The first dual chamber ball-screw mechanisms 252a also includes a first motor 262a that is arranged in threaded engagement with the first threaded rod 260a and is therefore configured to drive the first threaded rod 260a and therefore the first pair of driven pistons 258a, 258b in first and second directions 215a, 215b within the first cylinder housing 256a. The first and second directions 215a, 215b are longitudinally opposed in relation to one another. When the first motor 262a drives the first threaded rod 260a and thus the first pair of driven pistons 258a, 258b in the first direction 215a, the volume of the first variable volume chamber 254a increases while the volume of the second variable volume chamber 254b decreases. This causes hydraulic fluid in the first pump line 234a to flow into the first variable volume chamber 254a and hydraulic fluid in the second variable volume chamber 254b to flow out into the second pump line 234b, which decreases fluid pressure in the first hydraulic circuit 220a and increases fluid pressure in the second hydraulic circuit 220b. When the first motor 262a drives the first threaded rod 260a and thus the first pair of driven pistons 258a, 258b in the second direction 215a, the volume of the first variable volume chamber 254a decreases while the volume of the second variable volume chamber 254b increases. This causes hydraulic fluid in the first variable volume chamber 254a to flow out into the first pump line 234a and hydraulic fluid in the second pump line 234b to flow into the second variable volume chamber 254b, which increases fluid pressure in the first hydraulic circuit 220a and decreases fluid pressure in the second hydraulic circuit 220b.

The second dual chamber ball-screw mechanism 252b includes a third variable volume chamber 254c and a fourth variable volume chamber 254d at opposing ends of a second cylinder housing 256b. The third variable volume chamber 254c is arranged in fluid communication with the third pump line 234c and therefore the third hydraulic circuit 220c, while the fourth variable volume chamber 254d is arranged in fluid communication with the fourth pump line 234d and therefore the fourth hydraulic circuit 220d. The third and fourth variable volume chambers 254c, 254d are separated by a second pair of driven pistons 258c, 258d, which are connected to a move together in unison with a second threaded rod 260b. The second dual chamber ball-screw mechanisms 252b also includes a second motor 262b that is arranged in threaded engagement with the second threaded rod 260b and is therefore configured to drive the second threaded rod 260b and therefore the second pair of driven pistons 258c, 258d in third and fourth directions 215c, 215d within the second cylinder housing 256b. The third and fourth directions 215c, 215d are longitudinally opposed in relation to one another. When the second motor 262b drives the second threaded rod 260b and thus the second pair of driven pistons 258c, 258d in the third direction 215c, the volume of the third variable volume chamber 254c increases while the volume of the fourth variable volume chamber 254d decreases. This causes hydraulic fluid in the third pump line 234c to flow into the third variable volume chamber 254c and hydraulic fluid in the fourth variable volume chamber 254d to flow out into the fourth pump line 234d, which decreases fluid pressure in the third hydraulic circuit 220c and increases fluid pressure in the fourth hydraulic circuit 220d. When the second motor 262b drives the second threaded rod 260b and thus the second pair of driven pistons 258c, 258d in the fourth direction 215d, the volume of the third variable volume chamber 254c decreases while the volume of the fourth variable volume chamber 254d increases. This causes hydraulic fluid in the third variable volume chamber 254c to flow out into the third pump line 234c and hydraulic fluid in the fourth pump line 234d to flow into the fourth variable volume chamber 254d, which increases fluid pressure in the third hydraulic circuit 220c and decreases pressure fluid in the fourth hydraulic circuit 220d.

The first and second motors 262a, 262b are electrically connected to and controlled by controllers 280a, 280b and rotate in clockwise or counterclockwise directions depending on the polarity of the electric current supplied to the first and second motors 262a, 262b by the controllers 280a, 280b. This in turn drives linear/longitudinal movement of the first and second threaded rods 260a, 260b in opposite directions. The second pump line 234b and the fourth pump line 234d are connected to a hydraulic reservoir 212 (e.g., a tank) by first and second reservoir lines 213a, 213b that converge at a common reservoir line 214. A bi-directional pump 210 is arranged in-line and in fluid communication with the common reservoir line 214. The bi-directional pump 210 may operate (i.e., pump fluid) in two opposing directions 215e, 215f depending on the polarity of the electricity that is supplied to the bi-directional pump 210 by one or more of the controllers 280a, 280b. Thus, the controllers 280a, 280b can implement the same operating modes described above in connection with FIGS. 3-9.

A first reservoir shut-off valve 246a is positioned in the first reservoir line 213a and a second reservoir shut-off valve 246b is positioned in the second reservoir line 213b, which may be semi-active electro-mechanical valves with a combination of passive spring-disk elements and a solenoid that actuates the valve between open and closed positions. However, it should be appreciated that in the configuration illustrated in FIG. 10, the first and second pump shut-off valves 146a, 146a shown in FIGS. 2-9 have been eliminated because fluid cannot flow through the first and second dual chamber ball-screw mechanisms 252a, 252b.

Many other modifications and variations of the present disclosure are possible in light of the above teachings and may be practiced otherwise than as specifically described while within the scope of the appended claims.

What is claimed is:

1. A suspension system, comprising:
   a front left damper including a first compression chamber and a first rebound chamber;
   a front right damper including a second compression chamber and a second rebound chamber;
   a back left damper including a third compression chamber and a third rebound chamber;
   a back right damper including a fourth compression chamber and a fourth rebound chamber;
   a first hydraulic circuit that fluidly connects said first compression chamber of said front left damper and said fourth rebound chamber of said back right damper;
   a second hydraulic circuit that fluidly connects said first rebound chamber of said front left damper and said fourth compression chamber of said back right damper;
   a third hydraulic circuit that fluidly connects said second compression chamber of said front right damper and said third rebound chamber of said back left damper;
   a fourth hydraulic circuit that fluidly connects said second rebound chamber of said front right damper and said third compression chamber of said back left damper;
   a first bi-directional pump that is fluidly connected to and arranged between said first and second hydraulic circuits, said first bi-directional pump having a first operating mode for pumping hydraulic fluid in a first direction from said first hydraulic circuit to said second hydraulic circuit and a second operating mode for pumping hydraulic fluid in a second direction from said second hydraulic circuit to said first hydraulic circuit;
   a second bi-directional pump that is fluidly connected to and arranged between said third and fourth hydraulic circuits, said second bi-directional pump having a third operating mode for pumping hydraulic fluid in a third direction from said third hydraulic circuit to said fourth hydraulic circuit and a fourth operating mode for pumping hydraulic fluid in a fourth direction from said fourth hydraulic circuit to said third hydraulic circuit; and
   one or more controllers electrically connected to said first and second bi-directional pumps and programmed to concurrently activate at least one of said first and second operating modes of said first bi-directional pump and at least one of said third and fourth operating modes of said second bi-directional pump.

2. The suspension system as set forth in claim 1, wherein said first hydraulic circuit includes a first hydraulic line that extends between and fluidly connects said first compression chamber of said front left damper and said fourth rebound chamber of said back right damper and a first pump line that extends between and fluidly connects said first hydraulic line and a first port of said first bi-directional pump, wherein said second hydraulic circuit includes a second hydraulic line that extends between and fluidly connects said first rebound chamber of said front left damper and said fourth compression chamber of said back right damper and a second pump line that extends between and fluidly connects said second hydraulic line and a second port of said first bi-directional pump, wherein said third hydraulic circuit includes a third hydraulic line that extends between and fluidly connects said second compression chamber of said front right damper and said third rebound chamber of said back left damper and a third pump line that extends between and fluidly connects said third hydraulic line and a third port of said second bi-directional pump, and wherein said fourth hydraulic circuit includes a fourth hydraulic line that extends between and fluidly connects said second rebound chamber of said front right damper and said third compression chamber of said back left damper and a fourth pump line that extends between and fluidly connects said fourth hydraulic line and a fourth port of said second bi-directional pump.

3. The suspension system as set forth in claim 2, further comprising:
   a first pump shut-off valve positioned in said first pump line, the first pump shut-off valve being a two position electro-mechanical valve with a fully open position and a fully closed position; and
   a second pump shut-off valve positioned in said second pump line, the second pump shut-off valve being a two position electro-mechanical valve with a fully open position and a fully closed position.

4. The suspension system as set forth in claim 3, further comprising:
   a reservoir, wherein said first pump line is arranged in fluid communication with said reservoir via a first reservoir line and said second pump line is arranged in fluid communication with said reservoir via a second reservoir line;
   a third pump shut-off valve positioned in said first reservoir line, the third pump shut-off valve being a two position electro-mechanical valve with a fully open position and a fully closed position; and
   a fourth pump shut-off valve positioned in said second reservoir line, the fourth pump shut-off valve being a two position electro-mechanical valve with a fully open position and a fully closed position.

5. The suspension system as set forth in claim 4, further comprising:
   a front left bridge line that extends between and fluidly connects said first and second hydraulic lines;
   a front left shut-off valve that is positioned in said front left bridge line;
   a front right bridge line that extends between and fluidly connects said third and fourth hydraulic lines;
   a front right shut-off valve that is positioned in said front right bridge line;
   a back left bridge line that extends between and fluidly connects said third and fourth hydraulic lines;
   a back left shut-off valve that is positioned in said back left bridge line;
   a back right bridge line that extends between and fluidly connects said first and second hydraulic lines; and
   a back right shut-off valve that is positioned in said back right bridge line,
   wherein said front left shut-off valve, said front right shut-off valve, said back left shut-off valve, and said back right shut-off valve are two position electro-mechanical valves, each having a fully open position and a fully closed position.

6. The suspension system as set forth in claim 5, wherein said one or more controllers are programmed to initiate:
   a comfort operating mode where said first and second bi-directional pumps are deactivated, each of said front left shut-off valve, said front right shut-off valve, said back left shut-off valve, and said back right shut-off valve are in said fully open position, each of said first and second pump shut-off valves are in said fully open position, and each of said third and fourth pump shut-off valves are in said fully closed position.

7. The suspension system as set forth in claim 5, wherein said one or more controllers are programmed to initiate:
   a first pressure control operating mode where said first bi-directional pump is activated in said first operating mode while said second bi-directional pump is activated in said third operating mode, each of said front left shut-off valve, said front right shut-off valve, said back left shut-off valve, and said back right shut-off valve are in said fully open position, each of said first and second pump shut-off valves are in said fully closed position, and each of said third and fourth pump shut-off valves are in said fully open position such that said first and second bi-directional pumps operate to pump hydraulic fluid out of said first and third hydraulic circuits and into said reservoir to reduce fluid pressure in said hydraulic circuits; and
   a second pressure control operating mode where said first bi-directional pump is activated in said second operating mode while said second bi-directional pump is activated in said fourth operating mode, each of said front left shut-off valve, said front right shut-off valve, said back left shut-off valve, and said back right shut-off valve are in said fully open position, each of said first and second pump shut-off valves are in said fully closed position, and each of said third and fourth pump shut-off valves are in said fully open position such that said first and second bi-directional pumps operate to pump hydraulic fluid out of said reservoir and into said first and third hydraulic circuits to increase fluid pressure in said hydraulic circuits.

8. The suspension system as set forth in claim 5, wherein said one or more controllers are programmed to initiate:
   a combined pitch and roll control operating mode where each of said front left shut-off valve, said front right shut-off valve, said back left shut-off valve, and said back right shut-off valve are in said fully closed position, each of said first and second pump shut-off valves are in said fully open position, and each of said third and fourth pump shut-off valves are in said fully closed position, and either said first bi-directional pump is activated in said first operating mode while said second bi-directional pump is activated in said third operating mode or said first bi-directional pump is activated in said second operating mode while said second bi-directional pump is activated in said fourth operating mode, and wherein said first and second bi-directional pumps are actuated such that said first bi-directional pump creates a first pressure differential between said first and second hydraulic circuits that is different than a second pressure differential that is created between said third and fourth hydraulic circuits by said second bi-directional pump.

9. The suspension system as set forth in claim 1, wherein said one or more controllers are programmed to initiate:
   a first pitch control operating mode where said first bi-directional pump is activated in said first operating mode while said second bi-directional pump is activated in said third operating mode to increase fluid pressure in said second and fourth hydraulic circuits and increase compression stiffness in said back left damper and said back right damper; and
   a second pitch control operating mode where said first bi-directional pump is activated in said second operating mode while said second bi-directional pump is activated in said fourth operating mode to increase fluid pressure in said first and second hydraulic circuits and increase compression stiffness in said front left damper and said front right damper.

10. The suspension system as set forth in claim 1, wherein said one or more controllers are programmed to initiate:
    a first roll control operating mode where said first bi-directional pump is activated in said first operating mode while said second bi-directional pump is activated in said fourth operating mode to increase fluid pressure in said second and third hydraulic circuits and increase compression stiffness in said front right damper and said back right damper; and
    a second roll control operating mode where said first bi-directional pump is activated in said second operating mode while said second bi-directional pump is activated in said third operating mode to increase fluid pressure in said first and fourth hydraulic circuits and increase compression stiffness in said front left damper and said back left damper.

* * * * *